April 12, 1938.  H. FINZEL  2,113,583

UPSETTING APPARATUS

Filed Dec. 30, 1935

Inventor:

Patented Apr. 12, 1938

2,113,583

UNITED STATES PATENT OFFICE 2,113,583

UPSETTING APPARATUS

Herrmann Finzel, Frankfort-on-the-Main, Germany

Application December 30, 1935, Serial No. 56,742
In Germany December 31, 1934

4 Claims. (Cl. 219—3)

This invention relates to a method for the chip-free shaping, for instance upsetting, swaging or the like, in which the chuck and the press ram are used both as current conductors for the electric resistance heating of the work piece.

Such methods are known per se but the known methods possess various inconveniences such as only one operation is possible at one time and another in that the material is subjected to stresses which destroy the metal structure and therefore prejudicially influence the quality of the finished work. As only one operation is at disposal, only very simple shapes can be obtained which mostly require subsequent fashioning. The result is, that the possibilities to reduce the cost of the manufacturing cannot be fully utilized. The destruction of the structure of the material unavoidable in the known methods is based upon the fact that the blank is subjected from the beginning, as soon as the heating current is closed to the full pressure exerted by the tool. The shaping of the blank begins therefore at the moment at which its resistance against shaping reduced by the resistance heating yields to the pressing pressure of the tool.

This, is however, not at all the state in which the upsetting or other treatment may take place without exerting a destroying influence on to the metal structure.

The problems to be solved by the invention are therefore as follows:—A device had to be provided in which, similar as in the automatic turning or milling machine, or stamping presses with feeder devices, the most various operations can be carried out successively in the same machine.

As during the upsetting in a mould the treatment of the work piece is possible only for the short period in which the material possesses a very limited heat from which it cools rapidly, the individual operations must be carried through in extraordinarily rapid succession, especially if, which is particularly desirable, the work piece has to be submitted to one heating only prior to the first operation. Finally care has to be taken that the pressing pressure is exerted upon the material only when this material has attained the temperature actually suitable for its composition, at which temperature a shaping without chips, upsetting or swaging is possible without internal tearing or wrong displacement of the structure of the material.

According to the invention these problems are solved by using in the upsetting method the revolving tool box commonly used for turning and by specially arranging in this revolving tool box the tools designed for carrying out the first operation. This press ram for the first operation is shiftably mounted in the chuck which carries all the press rams and it is controlled so that it advances during the movement of the chuck towards the work piece, this ram touching the work piece and closing the heating circuit before the chuck has arrived in its operative position, this ram transmitting, while it is moving back relatively to the chuck, the full heating capacity upon the work piece so that this heating is completely finished when the chuck moving behind the ram has arrived in the position in which it exerts the pressing pressure upon the press ram and begins to transmit through this ram the pressure upon the work piece. The revolving tool box and its elements co-operating with the same, commonly used for feeding, are adapted to the present method. In the upsetting method several operations on several work pieces can be carried out at every pressing stroke. According to the new method two or a greater number of revolving tool boxes are arranged the one opposite the other, the one carrying as many tools and the other as many work pieces as operations are required for the whole method.

When the machine is started, it holds in one revolving tool box all press rams, the other revolving box being empty. Into this second revolving box a work piece is then introduced and this work piece is preliminarily treated by the first of the press rams during the first operation. The revolving box holding the work piece revolves then relative to the revolving tool box by such an angle that the preliminarily treated work piece is opposite the second press ram. During this part revolution of the revolving tool box a fresh work piece is inserted at the point which is now opposite the first press ram. During the second operation the second tool acts upon the preliminarily treated work piece and the first tool acts upon the second work piece. The machine continues to operate in this manner until every chamber in the revolving work box contains a work piece, each one of these work pieces being in another method stage. At the end of every complete revolution of the revolving work piece box a finished work drops out, a fresh work piece being introduced at the same time.

An embodiment of the machine for carrying out the method is diagrammatically illustrated, by way of example, in the accompanying drawing in which:—

Figure 2:
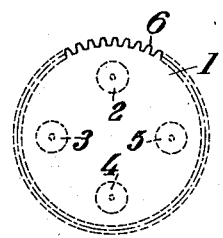
Fig. 2 shows one of the revolving boxes in elevation.
Figure 1:
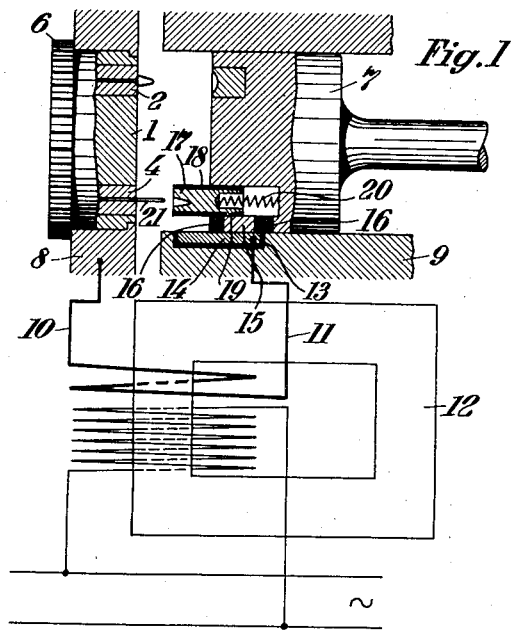
Fig. 1 shows a section through the two revolving boxes in open position.

The revolving box 1 comprises the chucks 2, 3, 4 and 5 for the work pieces and has a toothed flange 6. The other revolving box 7 is shiftable and comprises the chucks for the tools. Four work pieces are opposite three press rams and one charging and ejecting stage. The bearings 8 and 9 of the two revolving boxes have wires 10 and 11 leading to a heat transformer 12. The bearing 8 transmits for instance the current directly to the revolving box 1 and thus transmits the heat to all the chucks 2, 3, 4 and 5. A sliding piece 14 to which current is supplied is embedded in the bearing 9 in an insulation layer 13. The revolving box 7 has a similar sliding piece 15, embedded in an insulation layer 16. A tool 17 is shiftably mounted in the revolving box and designed to serve during the first operation. This tool is covered with an insulation layer 18 interrupted at one point by a contact piece 19. This contact piece is conductively connected with the sliding piece 15 of the revolving box 7. Tool 17 is under the influence of a spring 20 having the tendency to push it forward. For this spring any other suitable device may be substituted. A positively acting device may also be employed. The device for pushing forward the press ram is arranged so that it exerts upon the ram only a comparatively slight pressure which is not sufficient to deform the work. If, after a pressing stroke, the revolving box 7 moves backwards, the press ram 17 projects from its bearing as shown in Fig. 1. If, however, the revolving box 7 is moved towards the work pieces, the press ram 17 touches the work piece 21 projecting from the chuck 4 by the length to be shaped, before the revolving box 7 can effectively transmit its pressure. The heating circuit is thus closed. The revolving box 7 continues to move towards the revolving box 1 and the press ram 17, bearing against the work piece 21, is pushed back into its bearing. Before the press ram has reached the bottom of its bearing, the heating current has heated the work piece to forging heat and the circuit is interrupted, because the contact piece is opposite the insulation layer 16 and no current can be transmitted. As soon as the press ram is in contact with the base of its bearing, it begins to exert the upsetting pressure on to the work piece.

The other tools act in the usual manner as they are not shiftably mounted in their bearings.

Figure 3:
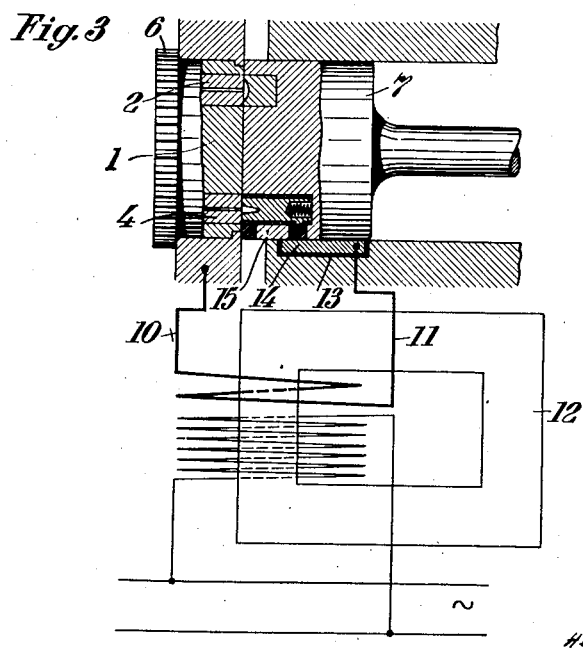
Fig. 3 shows in section the two revolving boxes in closed position.

The position which the tools occupy during the upsetting operation is shown in Fig. 3.

The revolving boxes 1 and 7 then move away the one from the other; the revolving head 1 being revolved by 90° at the end of each operation and another chuck is brought opposite the press ram 17. The work piece in the second chuck is at the preliminary upsetting stage, the work piece in the third chuck in the stage of finished upsetting and a fresh work piece is charged into the fourth chuck from which the finished work piece has been expelled.

In the apparatus described and shown only the revolving box 1 is revolved, box 7 being shiftable in longitudinal direction. Box 7 might be revolvable and box 1 only shiftable. The arrangement may further be such that only one box carries out both movements, the chief condition being that relative movements take place between the two boxes.

As many tools and work pieces as desired may be accommodated in the boxes instead of the four tools and three work pieces, the number depending on the number of operations which are necessary for carrying out the method.

As, according to the invention, the work piece has to be heated only once, prior to the first upsetting operation, all the operations must be carried out very rapidly, the revolution requiring only a few seconds. The individual operations must therefore be carried out at extraordinarily high speed, the time at disposal being also a few seconds only. Consequently only a very short time is at disposal for the backward movement of the press ram 17. To obtain in this short time sufficient heating of the work, the current intensity has to be calculated very carefully and the really obtained heating must be tested by means of the finest devices for measuring the temperature, for instance selenium cells or the like. These accurate previous calculations and practical verifications are suppositions for the method.

A special advantage resulting from the method consists in that the heating of the work piece is limited almost exclusively to the portion of the same which has to be treated so that on the remaining portion of the work piece clamped in the chuck during the upsetting operation no hammer scale can form. This portion of the work piece need be only so thick as it has to be when the work piece is finished. Subsequent treatment is therefore excluded which would mean increase of expenses and loss of material.

In another embodiment of the invention, in which several revolving boxes are employed, several press rams may operate against one revolving box, for instance in a round-about automatic machine, whereby the output of the machine tool constructed according to the method can be still increased. The method according to the invention can be carried through also on such machines in which the revolving box for the work pieces is revolvably mounted parallel with or perpendicularly to the direction of the rams of the other box.

I claim:—

1. Apparatus of the character described, comprising two mutually movable revolvable boxes, bearings for the boxes, an electric resistance heating circuit in communication with the boxes, one of the boxes carrying a series of chucks for work pieces, a corresponding number of chucks carried by the other box for tools, means for mutually displacing said boxes to bring the tools opposite the respective work pieces, the tool for the first operation being spring supported in its chuck and normally projecting therefrom, co-operating contacts carried by one box and its bearing and engageable for the completion of the electric circuit at a point in the movement of the tool for the first operation with the current interrupted when the tool is completely received in its chuck under influence of a work piece engaged therewith.

2. Apparatus of the character described, comprising two mutually movable revolvable boxes, bearings for the boxes, an electric resistance heating circuit in communication with the boxes, one of the boxes carrying a series of chucks for work pieces, a corresponding number of chucks carried by the other box for tools, means for mutually displacing said boxes to bring the tools opposite the respective work pieces, the tool for the first operation being spring supported in its chuck and normally projecting therefrom, co-operating contacts carried by one box and its bearing and engageable for the completion of the electric circuit at a point in the movement of the tool for the first operation with the current interrupted when the tool is completely received in its chuck under influence of a work piece engaged therewith, and a contact on the tool for the first operation coacting with the contact on said box.

3. Apparatus of the character described, including a supporting bearing surface, a box member mounted on said bearing surface and carrying a plurality of chucks for work pieces, an oppositely-disposed box member mounted on said bearing surface and carrying a corresponding number of chucks for tools, means for displacing said boxes to bring said tools opposite the respective work pieces whereby a plurality of different operations are simultaneously performed on the work pieces, a source of electric energy in communication with at least one of said work pieces and its corresponding tool to complete an electric current upon contact between the two and means for interrupting said communication upon application of deforming pressure upon said work piece.

4. Apparatus of the character described, including a supporting bearing surface, a box member mounted on said bearing surface and carrying a plurality of chucks for work pieces, an oppositely-disposed box member mounted on said bearing surface and carrying a corresponding number of chucks for tools, means for displacing said boxes to bring said tools opposite the respective work pieces, at least one of said tools being resiliently mounted within its chuck and extending outwardly therefrom for initial contact with its corresponding work piece, a source of electric energy in communication with said outwardly extending tool and its corresponding work piece for the completion of an electric circuit upon contact between the two, and means for interrupting said current when deforming pressure is applied to said last-named work piece.

HERRMANN FINZEL.